United States Patent
Wilson et al.

(10) Patent No.: US 8,650,356 B2
(45) Date of Patent: Feb. 11, 2014

(54) MICROCONTROLLER WITH CAN MODULE

(75) Inventors: Tim L. Wilson, Chandler, AZ (US);
Joseph W. Triece, Phoenix, AZ (US);
Steven G. Dawson, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 778 days.

(21) Appl. No.: 12/776,046

(22) Filed: May 7, 2010

(65) Prior Publication Data

US 2010/0306457 A1 Dec. 2, 2010

Related U.S. Application Data (60) Provisional application No. 61/181,720, filed on May 28, 2009.

(51) Int. Cl.
*G06F 15/16* (2006.01)
(52) U.S. Cl.
USPC ........................................................ 711/104
(58) Field of Classification Search
None
See application file for complete search history.

(56) References Cited

U.S. PATENT DOCUMENTS

| | | | |
|---|---|---|---|
| 4,881,167 A | 11/1989 | Sasaki et al. | 364/200 |
| 6,944,739 B2 * | 9/2005 | Bartling et al. | 711/168 |
| 2006/0218557 A1 | 9/2006 | Garthwaite et al. | 718/105 |
| 2008/0162860 A1 * | 7/2008 | Sabbatini et al. | 711/170 |

FOREIGN PATENT DOCUMENTS

| | | | |
|---|---|---|---|
| CN | 1556642 A | 12/2004 | |
| EP | 1 085 718 A2 | 3/2001 | H04L 29/06 |

OTHER PUBLICATIONS

Paul E. Black, "data structure", in Dictionary of Algorithms and Data Structures [online], Paul E. Black, ed., U.S. National Institute of Standards and Technology. Dec. 15, 2004.*
International PCT Search Report and Written Opinion, PCT/US2010/035767, 13 pages, Mailed Sep. 9, 2010.
Chinese Office Action, Application No. 201080008842.1, 13 pages, Oct. 22, 2013.

* cited by examiner

*Primary Examiner* — Matthew Bradley
*Assistant Examiner* — Ramon A Mercado
(74) *Attorney, Agent, or Firm* — King & Spalding L.L.P.

(57) ABSTRACT

A microcontroller has a random access memory, and a Controller Area Network (CAN) controller with a control unit receiving an assembled CAN message. The control unit generates a buffer descriptor table entry using the assembled CAN message and stores the buffer descriptor table entry in the random access memory, and the buffer descriptor table entry has at least a message identifier and load data from the CAN message and information of a following buffer descriptor table entry.

20 Claims, 6 Drawing Sheets

| | |
|---|---|
| 210 | Frame Status [31:0] |
| 220 | NEXT_EDT[31:0] -location of next EDT |
| 230 | CANMSG (SID) |
| 240 | CANMSG (EID/DLC) |
| 250 | DATA[Byte 7:4] |
| 260 | DATA[Byte 3:0] |

Standard Message:

Extended Message:

*Figure 3*

| 210 | Frame Status [31:0] |
|---|---|
| 220 | NEXT_EDT[31:0] -location of next EDT |
| 230 | CANMSG (SID) |
| 240 | CANMSG (EID/DLC) |
| 250 | DATA[Byte 7:4] |
| 260 | DATA[Byte 3:0] |

MICROCONTROLLER WITH CAN MODULE

CROSS-REFERENCE TO RELATED APPLICATIONS

This application claims the benefit of U.S. Provisional Application No. 61/181,720 filed on May 28, 2009, entitled "LIGHTWEIGHT BUFFER DESCRIPTOR TABLE", which is incorporated herein in its entirety.

TECHNICAL FIELD

The present disclosure relates to controller-area network (CAN or CAN-bus) compatible microcontrollers, and, more particularly, to a light weight buffer descriptor table (BDT) used for CAN message storage.

BACKGROUND

Controller Area Network (CAN) is a serial communications protocol which efficiently supports distributed real-time control with a high level of security. Applications of CAN range from high speed digital communications networks to low cost multiplex wiring. CAN is a high-integrity serial data communications bus for real-time applications. CAN operates at data rates of up to 1 Megabits per second, has excellent error detection and confinement capabilities, and was originally developed for use in automobiles but is now also used in other areas as well. The interface between the CAN bus and the CPU is usually called the CAN controller. The motivation behind CAN was to make automobiles more reliable, safe and fuel-efficient by improving the interoperability of automotive electronics, engine control units, sensors, anti-skid brake systems, etc., while decreasing wiring harness weight and complexity. Since CAN's inception, the CAN protocol has gained widespread popularity in industrial automation and automotive/truck applications. The robustness of the CAN bus in noisy environments and the ability to detect and recover from fault conditions makes CAN suitable for use with, industrial control equipment, medical equipment, test equipment, mobile and portable machines, appliances, etc.

CAN is an asynchronous serial bus system with one logical bus line. It has an open, linear bus structure with equal bus nodes. A CAN bus consists of two or more nodes. The number of nodes on the bus may be changed dynamically without disturbing the communication of the other nodes.

The CAN logic bus corresponds to a "wired-AND" mechanism, "recessive" bits (mostly, but not necessarily equivalent to the logic level "1") are overwritten by "dominant" bits (mostly logic level "0"). As long as no bus node is sending a dominant bit, the bus line is in the recessive state, but a dominant bit from any bus node generates the dominant bus state. Therefore, for the CAN bus line, a medium is chosen that is able to transmit the two possible bit states (dominant and recessive). A common physical medium used is a twisted wire pair. The bus lines are then called "CANH" and "CANL," and may be connected directly to the CAN controller nodes or via a connector thereto.

In the CAN bus protocol it is not bus nodes that are addressed, but rather the address information is contained in the messages that are transmitted. This is done via an identifier (part of each message) which identifies the message content, e.g., engine speed, oil temperature, etc. The identifier additionally indicates the priority of the message. The lower the binary value of the identifier, the higher the priority of the message (more dominant bits).

The original CAN specifications (Versions 1.0, 1.2 and 2.0A) defined the message identifier as having a length of 11 bits, giving a possible 2048 message identifiers. An "extended CAN" specification Version 2.0B allows message identifier lengths of 11 and/or 29 bits to be used (an identifier length of 29 bits allows over 536 Million message identifiers). The CAN specifications (all versions) are incorporated by reference herein for all purposes.

Generally, two approaches may be used for CAN since an architecture for the CAN controller is not covered by the CAN standard, these two approaches are: "BasicCAN" and "FullCAN" (not to be confused with CAN 1 and CAN 2, or standard identifiers and extended identifiers); they differ in the buffering of messages.

The BasicCAN controller architecture is similar to simple UART, except that complete frames are sent instead of characters. Typically, there is a single transmit buffer and a double-buffered receive buffer. For example, a microcontroller puts a frame in the transmit buffer, and receives an interrupt when the frame is sent. When a frame is received in the receive buffer, the microcontroller receives an interrupt to empty the receive buffer and empties the frame from the receive buffer before a subsequent frame is received. In the BasicCAN controller architecture the microcontroller must manage the transmission and reception, and handle the storage of the frames.

The FullCAN controller architecture comprises a dedicated buffer and stores frames in this dedicated buffer. A limited number of frames may be dealt with depending on the size of the dedicated buffer. Each frame buffer is tagged with the identifier of the frame mapped to the buffer. The microcontroller can update a frame in the buffer and mark it for transmission. Receive buffers can be examined to see if a frame with a matching identifier has been received. In addition, filters may be used to pre-screen a received frame so that only those frames intended for use by the particular CAN controller is stored in a receive buffer.

Standard CAN vs Extended CAN

The CAN protocol usually comes in two versions: CAN 1.0 and CAN 2.0. CAN 2.0 is backwardly compatible with CAN 1.0, and most new controllers are built according to CAN 2.0. There are two parts to the CAN 2.0 standard: part A and part B. With CAN 1.0 and CAN 2.0A, identifiers must be 11-bits long. With CAN 2.0B identifiers can be 11-bits (a "standard" identifier) or 29-bits (an "extended" identifier). To comply with CAN 2.0 a controller must be either 2.0 part B passive, or 2.0 part B active. If it is passive, then it must ignore extended frames (CAN 1.0 controllers will generate error frames when they see frames with 29-bit identifiers). If it is active then it must allow extended frames to be received and transmitted. There are some compatibility rules for sending and receiving the two types of frames:

CAN 2.0B active controllers will send and accept both standard and extended frames. CAN 2.0B passive controllers will send and receive standard frames, and will discard extended frames without error.

CAN 1.0 controllers will generate errors when they see extended frames. Thus, a network where there is a single CAN 1.0 controller on the network cannot live with extended frames on the network; all the controllers must send using standard frames."

Controller Architectures

The architecture of controllers isn't covered by the CAN standard, so there is a variation in how they are used. There are, though, two general approaches: BasicCAN and Full- CAN (not to be confused with CAN 1.0 and 2.0, or standard identifiers and extended identifiers); they differ in the buffering of messages."

As stated above, in a BasicCAN controller the architecture is similar to a simple UART, except that complete frames are sent instead of characters: there is (typically) a single transmit buffer, and a double-buffered receive buffer. The CPU puts a frame in the transmit buffer, and takes an interrupt when the frame is sent; the CPU receives a frame in the receive buffer, takes an interrupt and empties the buffer (before a subsequent frame is received). The CPU must manage the transmission and reception, and handle the storage of the frames."

As stated above, in a FullCAN controller the frames are stored in a dedicated buffer of the controller. A limited number of frames can be dealt with (typically 16); because there can be many more frames on the network, each buffer is tagged with the identifier of the frame mapped to the buffer. The CPU can update a frame in the buffer and mark it for transmission; buffers can be examined to see if a frame with a matching identifier has been received."

The intention with the FullCAN design is to provide a set of "shared variables" in the network; the CPU periodically updates the variables (i.e. the contents of frames in the buffer); the CPU also can examine the variables. In practice, things are not so simple (of course) because of concurrency difficulties: while reading a set of bytes from a frame, the controller could overwrite the data with the contents of a new frame, and in many controllers this is signaled only by a status flag."

In "Basic CAN" implementations, there is generally one double buffered receive channel with one or more associated message acceptance filters. Having but one double buffered message channel means that the processor must be capable of handling the previous message within this time. In "Full CAN" implementations, there are generally up to 15 message buffers or channels, each with one associated message acceptance filter. Having a large number of receive-buffers can be helpful in dealing with bursts of message traffic if the processor is very slow, however, if the total message traffic is such that it overwhelms the processor capability, no amount of buffering can prevent the eventual loss of a message. If a processor's CPU is very slow or busy, to receive many different addressed messages requires separate receive buffers and acceptance filters. With a faster processor, it is possible to use a more limited number of receive buffers with flexibility in the programming of the acceptance filters. In short, the processor must have the bandwidth to service the total traffic on the bus. A plurality of buffers is usually implemented as a compromise. However, each receive buffer has associated a plurality of mask registers and filter registers as well as associated comparators. This requires a large amount of silicon real estate.

There is, therefore, a need in the art for a CAN implementation that does not require a large amount of silicon area.

SUMMARY

According to an embodiment, a microcontroller may comprise a random access memory, and a Controller Area Network (CAN) controller comprising a control unit receiving an assembled CAN message, wherein the control unit generates a buffer descriptor table entry using the assembled CAN message and stores the buffer descriptor table entry in the random access memory, and wherein the buffer descriptor table entry comprises at least a message identifier and load data from the CAN message and information of a following buffer descriptor table entry.

According to a further embodiment, a buffer descriptor table entry may have a constant size. According to a further embodiment, the buffer descriptor table entry may further comprise a frame status and an extended CAN message identifier. According to a further embodiment, the microcontroller can be a 32-bit microcontroller and the buffer descriptor table entry consists of six 32-bit words. According to a further embodiment, the buffer descriptor table entry may comprise a frame status word, a next address location word, a message identifier word, an extended message identifier word, a first data word comprising four bytes, and a second data word comprising four bytes. According to a further embodiment, the random access memory can be a dual or multiple port memory. According to a further embodiment, the CAN controller may comprise a message assembly buffer shift register coupled with the control unit. According to a further embodiment, the CAN controller may comprise logic coupling a plurality of mask register and a plurality of filter registers with the control unit, wherein the logic generates a signal indicating a valid entry in the message assembly buffer shift register.

According to another embodiment, a method of storing a Controller Area Network (CAN) message within a microcontroller may comprise the steps of:—receiving a CAN message;—assembling the CAN message;—generating a buffer descriptor table entry using the assembled CAN message; and—storing the buffer descriptor table entry in a random access memory of the microcontroller, wherein the buffer descriptor table entry comprises at least a message identifier and load data from the CAN message and information of a following buffer descriptor table entry.

According to a further embodiment of the method, the CAN message can be a standard CAN message as well as an extended CAN message. According to a further embodiment of the method, a buffer descriptor table entry may have a constant size. According to a further embodiment of the method, the buffer descriptor table entry further may comprise a frame status and an extended CAN message identifier. According to a further embodiment of the method, the microcontroller can be a 32-bit microcontroller and the buffer descriptor table entry consists of six 32-bit words. According to a further embodiment of the method, the buffer descriptor table entry may comprise a frame status word, a next address location word, a message identifier word, an extended message identifier word, a first data word comprising four bytes, and a second data word comprising four bytes. According to a further embodiment of the method, the random access memory can be a dual or multiple port memory. According to a further embodiment of the method, the step of assembling a CAN message can be performed by a message assembly buffer shift register. According to a further embodiment of the method, the method may further comprise the step of generating a validity signal by means of a plurality of mask register and a plurality of filter registers indicating a valid entry in the message assembly buffer shift register.

According to yet another embodiment, a 32-bit microcontroller may comprise a dual port 32-bit wide random access memory; and a Controller Area Network (CAN) controller comprising a control unit receiving an assembled CAN message, wherein the control unit generates a buffer descriptor table entry using the assembled CAN message and stores the buffer descriptor table entry in the random access memory, and wherein the buffer descriptor table entry consists of a 32-bit frame status word, a 32-bit next address location word, a 32-bit message identifier word, a 32-bit extended message identifier word, a first 32-bit data word, and a second 32-bit data word.

According to a further embodiment of the 32-bit microcontroller, the CAN controller may comprise a message assembly buffer shift register coupled with the control unit. According to a further embodiment of the 32-bit microcontroller, the CAN controller may comprise logic coupling a plurality of mask register and a plurality of filter registers with the control unit, wherein the logic generates a signal indicating a valid entry in the message assembly buffer shift register.

The foregoing and other objects, features, and advantages of the invention will be apparent from the following, more particular, description of the preferred embodiments of the invention, as illustrated in the accompanying drawings.

DETAILED DESCRIPTION

Figure 2:
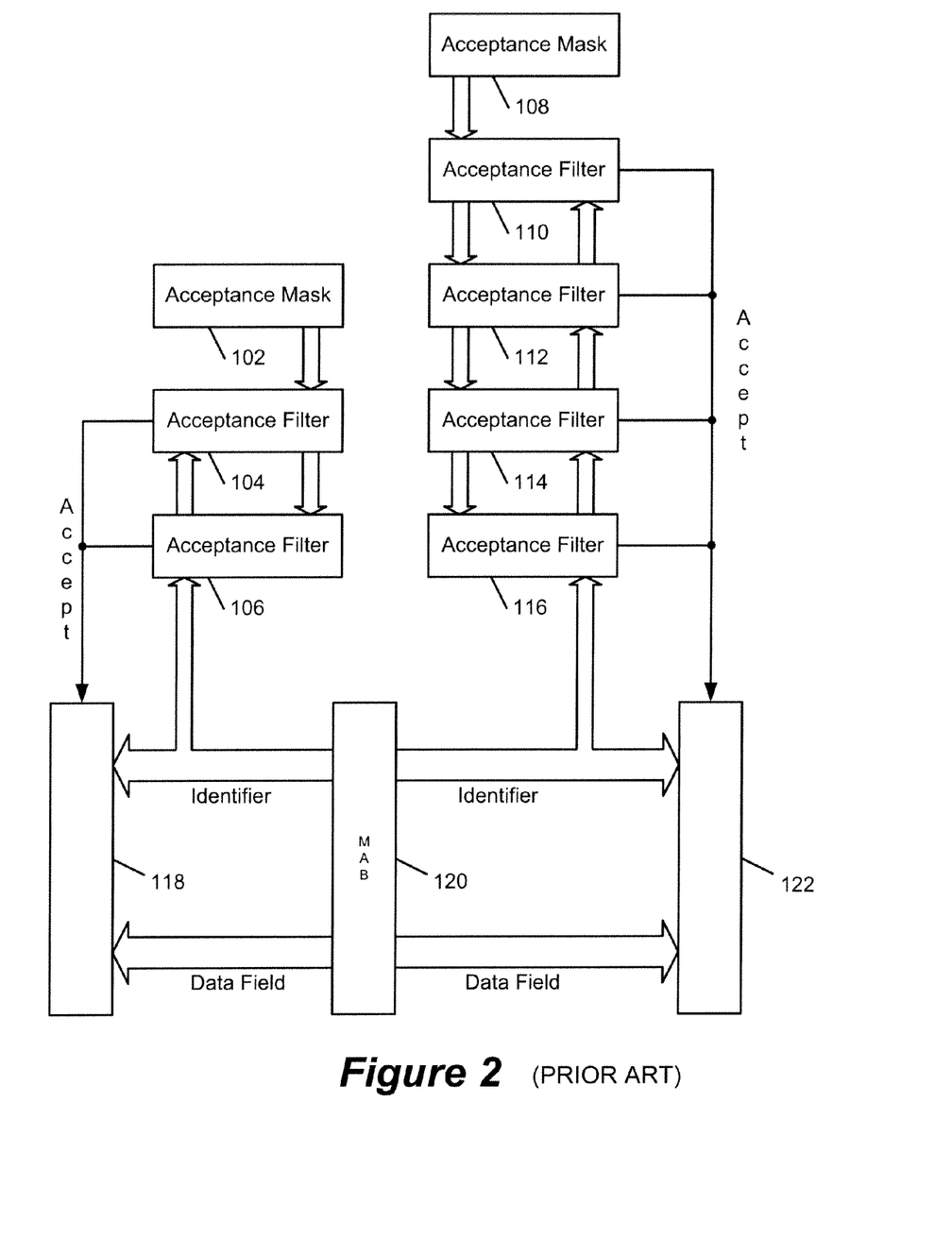
FIG. 2 shows a schematic diagram of the receive buffers and their associated filters of a conventional CAN controller.

Referring to FIG. 2, receive buffers 118, 120, and 122 and associated mask 102, 108 and filter registers 104, 106, 110, 112, 114, 116 of a conventional CAN controller for use in a microcontroller are illustrated. Buffer 120, designated as a message assembly buffer (MAB), functions only to monitor the CAN logic bus (not shown) for incoming messages. The MAB 120 holds a de-stuffed bit stream from the bus line. The bit stream consists of a message, i.e. a data frame, remote frame, or other frame, comprising an identifier and data field (not shown). The CAN controller comprises, for example, two dedicated buffers 118 and 122 which can be accessed by the CPU of a microcontroller. The MAB 120 allows these receive buffers 118 and 122 parallel access to the message. MAB 120 also allows acceptance filters 106 and 116 access to the identifier portion of the message. Parallel transfer of the bit stream message to receive buffers 118 or 122 may not be allowed until acceptance masks 102 and 108 and acceptance filters 104, 106, 110, 112, 114, and 116 apply an acceptance match test to the message. The number of buffers listed is only an example, more could be utilized.

Programmable acceptance filter masks 102 and 108, respectively, are used to select which bits of the unstuffed bit-stream message should be compared with the contents of acceptance filters 104 and 106, and 110, 112, 114, and 116.

The acceptance match test proceeds as follows: Filters 104, 106, 110, 112, 114, and 116 receive the identifier field of the message and compare that field to filter values. If there is a match between the identifier field and a filter value, then the message is loaded into the matching filter's corresponding receive buffer 118 or 122. Filters 104 and 106 are connected to buffer 118, filters 110, 112, 114, and 116 to buffer 122.

According to an embodiment, there can be an implied priority to the receive buffers. For example, buffer 118 may be the higher priority buffer and has message acceptance filters 104 and 106 associated with it. Buffer 122 can be the lower priority buffer and has acceptance filters 110, 112, 114, and 116 associated with it. That fewer filters are associated with buffer 118 than with buffer 122 means that buffer 118 is more restrictive than buffer 122. The more restrictive buffer 118 has, by implication, the higher criticality associated with it. Having a priority is not a requirement, but could be a selectable option.

On the occasion when two "high-priority" messages are received by MAB 120 in quick succession, receive buffer 118, designated as the first high-priority buffer, will receive the first high-priority message. Upon receipt of the second high-priority message, MAB 120 finds that buffer 118 is currently occupied by a high-priority message. MAB 120 then directs buffer 122, designated as the second high-priority buffer, to receive the second high-priority message. Buffers 118 and 122 are ranked, respectively, as the first high-priority buffer and the second high-priority buffer in this scenario.

The central processing unit (CPU) (not shown in FIG. 2) may operate on one of the receive buffers 118 and 122, while the other is available for reception or holding a previously received message.

According to an exemplary implementation, the protocol in the case of the arrival of two high-priority messages may be effected by the BUKT bit in the control registers (not shown) of receive buffers 118 and 122. Table I depicts and explains the control register of receive buffer 118, wherein R/W means Readable/Writable bit, and wherein R means Read-only bit.

TABLE I

| bit7 | bit6 | bit5 | bit4 | bit3 | bit2 | bit1 | bit0 |
|------|------|------|------|------|------|------|------|
| R/W | R/W | R/W | R/W | R/W | R/W | R | R/W | bit7: Message Ready Status
 1=Receive Buffer contains a valid received message
 0=Receive Buffer open to receive new message
 Bit is only set by CAN module, bit is only cleared by CPU.
bit6-5: Receive Buffer Operating Mode
 11=receive all messages including those with errors
 10=receive only valid messages with extended identifiers
 01=receive only valid messages with standard identifiers
 00=receive all valid messages
bit4: Message Reception Interrupt Enable
 1=Interrupt Enabled
 0=Interrupt Disabled
bit3: Received Remote Transfer Request
 1=Remote Transfer Request Received
 0=No Remote Transfer Request Received
bit2: (BUKT) Enable Overflow to Receive Buffer 122
 1=Receive Buffer 118 Overflow Will Write to Buffer 122
 0=No Overflow to Buffer 122 Allowed
bit1: Read Only Copy of bit2 (BUKT)
bit0: Indicates which acceptance filter enabled the message reception
 1=acceptance filter associated with Buffer 122
 0=acceptance filter associated with Buffer 118

If set to "1," the BUKT bit implements a priority-based protocol. Table II depicts and explains the control register of receive buffer 122.

TABLE II

| bit7 | bit6 | bit5 | bit4 | bit3 | bit2 | bit1 | bit0 |
|------|------|------|------|------|------|------|------|
| R/W  | R/W  | R/W  | R/W  | R/W  | R/W  | R/W  | R/W  | bit7: Message Ready Status
1=Receive Buffer contains a valid received message
0=Receive Buffer open to receive new message
Bit is only set by CAN module, bit is only cleared by CPU.
bit6-5: Receive Buffer Operating Mode [these bits are optional]
11=receive all messages including those with errors
10=receive only valid messages with extended identifiers
01=receive only valid messages with standard identifiers
00=receive all valid messages
bit4: Message Reception Interrupt Enable
1=Interrupt Enabled
0=Interrupt Disabled
bit3: Received Remote Transfer Request
1=Remote Transfer Request Received
0=No Remote Transfer Request Received
bit2-0: Indicates which acceptance filter enabled the message reception
101=acceptance filter 116
100=acceptance filter 114
011=acceptance filter 112
010=acceptance filter 110
001=acceptance filter 106 [only if BUKT bit set to "1" in control register for buffer 118]
000=acceptance filter 104 [only if BUKT bit set to "1" in control register for buffer 118]

Figure 1:
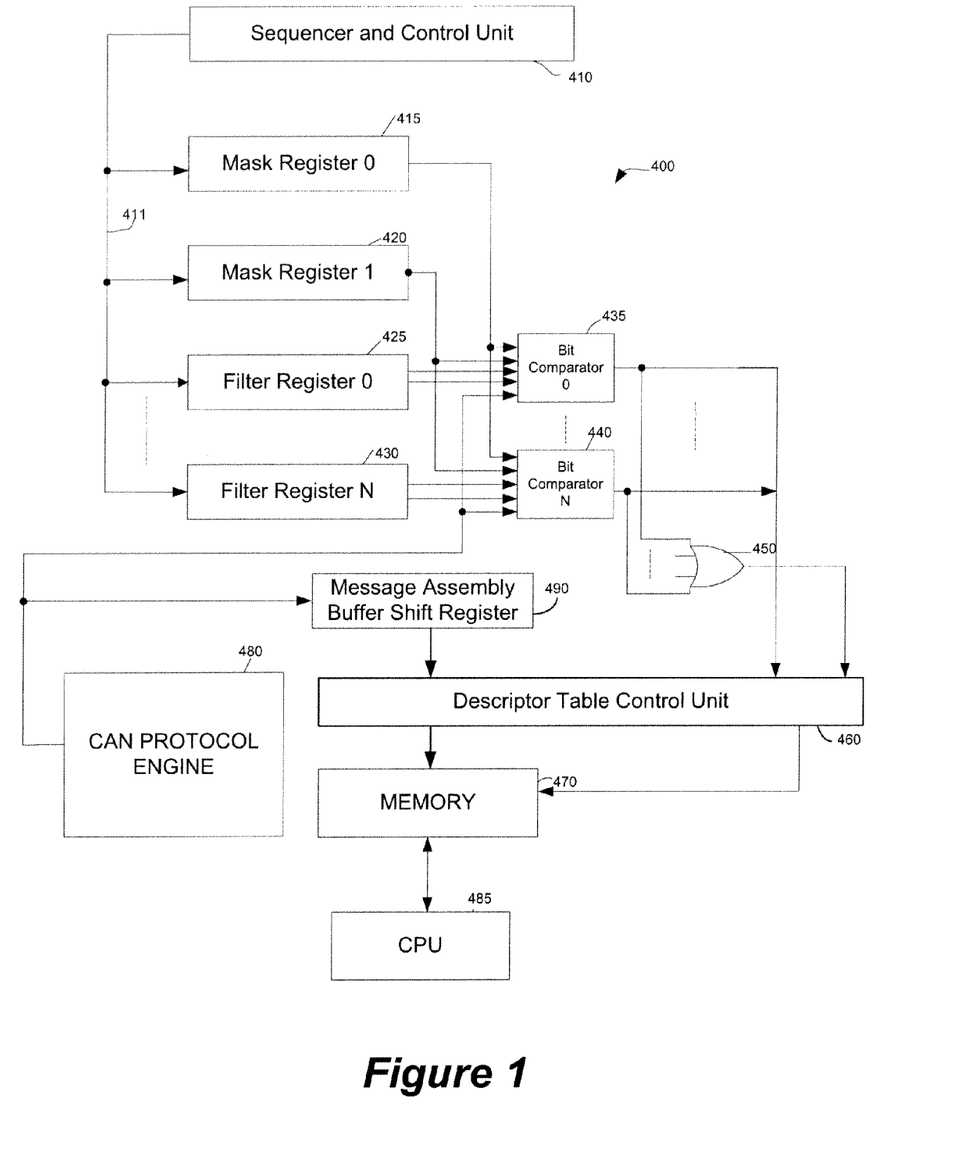
FIG. 1 shows a block diagram of parts of a microcontroller with a CAN module/controller according to an embodiment.

FIG. 1 shows an exemplary embodiment of a CAN controller for use in a microcontroller. A microcontroller is considered as a single chip device comprising at least a CPU, memory, and a plurality of peripheral devices such as a CAN module. In this embodiment of a CAN module/controller, a first and second mask register 415 and 420 may be bit-wise addressable and may comprise a single output bit. Furthermore, a plurality of filter registers 0 . . . N (only two are shown) are designated by numerals 425 and 430. The filter registers 425, 430 also may comprise a single output bit and are bit-wise addressable. In addition mask registers 415 and 420 as well as all filter registers 425, 430 can be read and write-able in a parallel mode by a central processing unit 485 (connection not shown in FIG. 1). A sequencer and control unit 410 may operate as a bit select unit and generates address signals which are fed to mask register 415 and 420 and all filter registers 425, 430. Each filter register 425, 430 may comprise an associated bit comparator unit 435, 440. The bit output signal of mask register 415 and 420 are fed to first and second inputs of bit comparator units 435, 440. Furthermore, each bit output of the filter registers 425, 430 may be fed to a third input of their associated bit comparator unit 435, 440. A bit stream signal from a CAN bus is provided by a CAN protocol engine 480 and fed to a fourth input of each bit comparator unit 435, 440. Filter registers 425, 430 can provide additional storage bits which are coupled with a fifth input of each associated bit comparator unit. Other designs for a CAN module with less or more functionality may be provided.

According to various embodiments, the output of each bit comparator unit 435, 440 may carry the acceptance signal and is coupled with a control input of a descriptor table control unit 460. An OR gate 450 may be provided having as many inputs as the number of filter registers. Each input receives an acceptance signal from a respective bit comparator unit 435, 440. The address output of descriptor table control unit 460 is coupled with an address input of the general purpose random access memory 470 of the microcontroller which is coupled with CPU 485. The output of OR gate 450 is coupled with another control input of descriptor table control unit 460. According to an embodiment, random access memory 470 can be a dual port or multi-port memory whose first data port is coupled with the data output of descriptor table control unit 460. Descriptor table control unit 460 receives an assembled message from standard message assembly buffer shift register 490 which again receives the serial data stream from the CAN protocol engine 495. The second data port of memory 470 is coupled with central processing unit 485. However, according to another embodiment, CPU 485 and descriptor table control unit 460 may share the same data bus coupled with memory 470.

A specifically designed buffer descriptor table is used to store CAN messages in a specific way into random access memory 470. Generally, a buffer descriptor table (BDT) as for example known from the Ethernet protocol has significant overhead associated with it. Moreover, such traditional buffer descriptor tables store pointer data that branches to different parts of the memory that actually store the data attached to or embedded in the message. The BDT may contain a relatively large amount of information that must be read. When the BDT is read in combination with data messages that are significantly larger then the information contained in the BDT, the overhead of reading and processing the information in the BDT is relatively low. This leads to a significant overhead and complicated memory management. However, for applications that have small data sizes, e.g., CAN systems, the overhead for reading and processing the information from the BDT can significantly impact system performance.

Thus, a specifically designed buffer descriptor table for use in a CAN controller is provided according to various embodiments. This specifically designed buffer descriptor table reduces the overhead in reading and processing information from the BDT of a CAN device. According to an embodiment, a lightweight BDT has been designed wherein each buffer descriptor table entry may have a constant size and/or contain the actual data load. According to the teachings of this disclosure, such a lightweight BDT gives up some of the flexibility of a full BDT, but saves significant silicon area, processing power required and bus accesses. In the lightweight BDT, a pointer to the data is eliminated and status fields can be merged, thus saving two (2) reads per BDT lookup.

Figure 4:
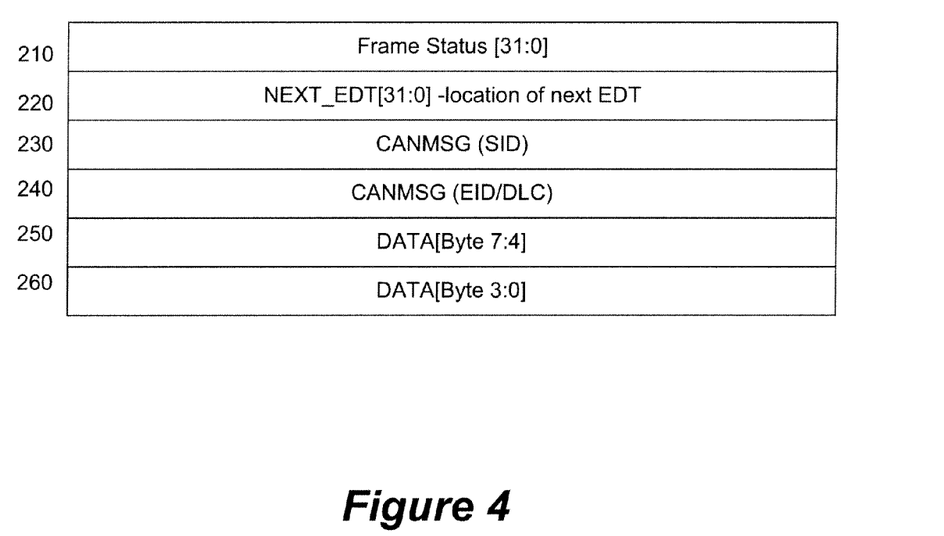
FIG. 4 shows a buffer descriptor table according to an embodiment for use with a CAN controller.

No limitations of a dedicated buffer apply. Rather the size of the system memory or available RAM theoretically limits how many entries are available. As mentioned above, the specific descriptor table used according to an embodiment allows for fast data retrieval because the number of required reads are minimized. According to an embodiment, a buffer descriptor table can comprise the following entries. Numeral 210 designates a first entry with 32 bits that contains the frame status. Numeral 220 designates the 32-bit address of the next table entry. Address 220 allows for a flexible handling of memory. For example, multiple non-consecutive memory segments may be used instead of consecutive table entries. Numeral 230 contains the standard CAN identifier (SID) and numeral 240 the extended identifier and DLC entry. The following two 32-bit words 250 and 260 comprise the actual 8 data bytes of the CAN message. Other buffer descriptor tables can be designed. A basic requirement according to various embodiments is to include the actual data load as well as a pointer to the next table entry. In addition, a status information and various identifier information may be added. The order of the respective entries may vary and is not critical.

Figure 3:
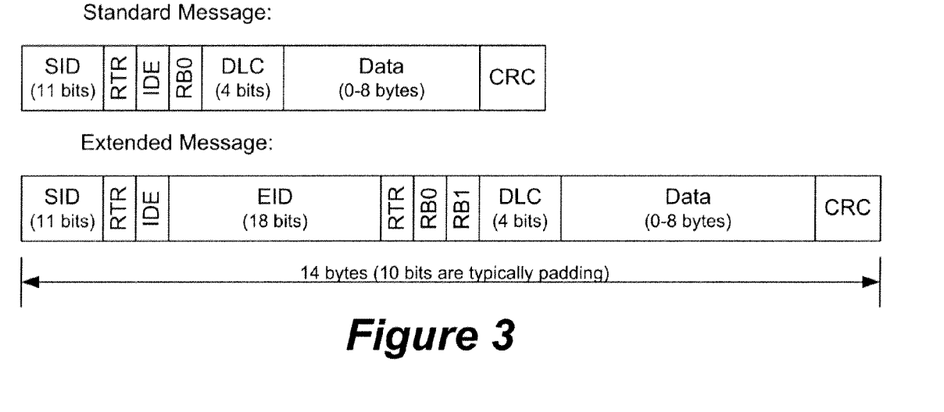
FIG. 3 shows the differences between a standard CAN message and an extended CAN message.

Descriptor table control unit 460 operates with this specifically designed buffer descriptor table as shown in FIG. 4. FIG. 3 shows standard and extended messages as they are received in the message assembly buffer shift register 490. The main difference lies in the additional sender identifier wherein in the extended version an additional 29 bits are provided to the standard 11 bit identifier. The data payload in both versions is 8 bytes. Thus a maximum of 14 bytes is required to store a CAN message. Once received an assembled message is forwarded in parallel to descriptor table control unit 460. Descriptor table control unit 460 also receives all necessary control signals generated through mask registers 415, 420, filter registers 425, 430 and evaluation logic 435, 440, 450. After receiving a valid message that is to be transferred into the buffer, descriptor table control unit 460 creates a buffer descriptor table entry as shown in FIG. 4 with the data received from the message assembly buffer. If this is the first table entry, a start table address may be retrieved from an associated control register. Otherwise, a next available address from field 220 of a previously stored table entry is used. Thus, no dedicated buffer memory is necessary, in particular no FIFO which requires substantial real estate on an integrated circuit. The various embodiments according to the present disclosure provide for a similar look and feel to the USB & Ethernet device without their respective complexity. The control unit only has to store a pointer to the first memory entry which saves a lot of otherwise required memory and logic.

A user program can allocate the memory space to the CAN controller and assign start and end addresses to descriptor table control unit 460, for example, through high level instructions, such as, malloc or any other suitable memory allocation instruction. A user program can then simply retrieve the respective table entries wherein the fixed assignment within each table entry allows for a very fast retrieval. Because the size of a buffer is only limited by the memory size, a very flexible management of the buffer applies wherein data cannot be lost easily. The buffer descriptor table as designed in FIG. 4 only requires four word reads for the actual CAN message from a table entry stored in memory. The status field can be easily updated and contain all necessary information. Time stamp entries can be easily included by the control unit.

Moreover, the actual data load is always stored within a table entry and thus has a constant offset of, for example, four 32-bit words (see FIG. 4) from the start address of each table entry. There exists no variable length in this structure which allows for a fast retrieval of the required information.

Figure 5:
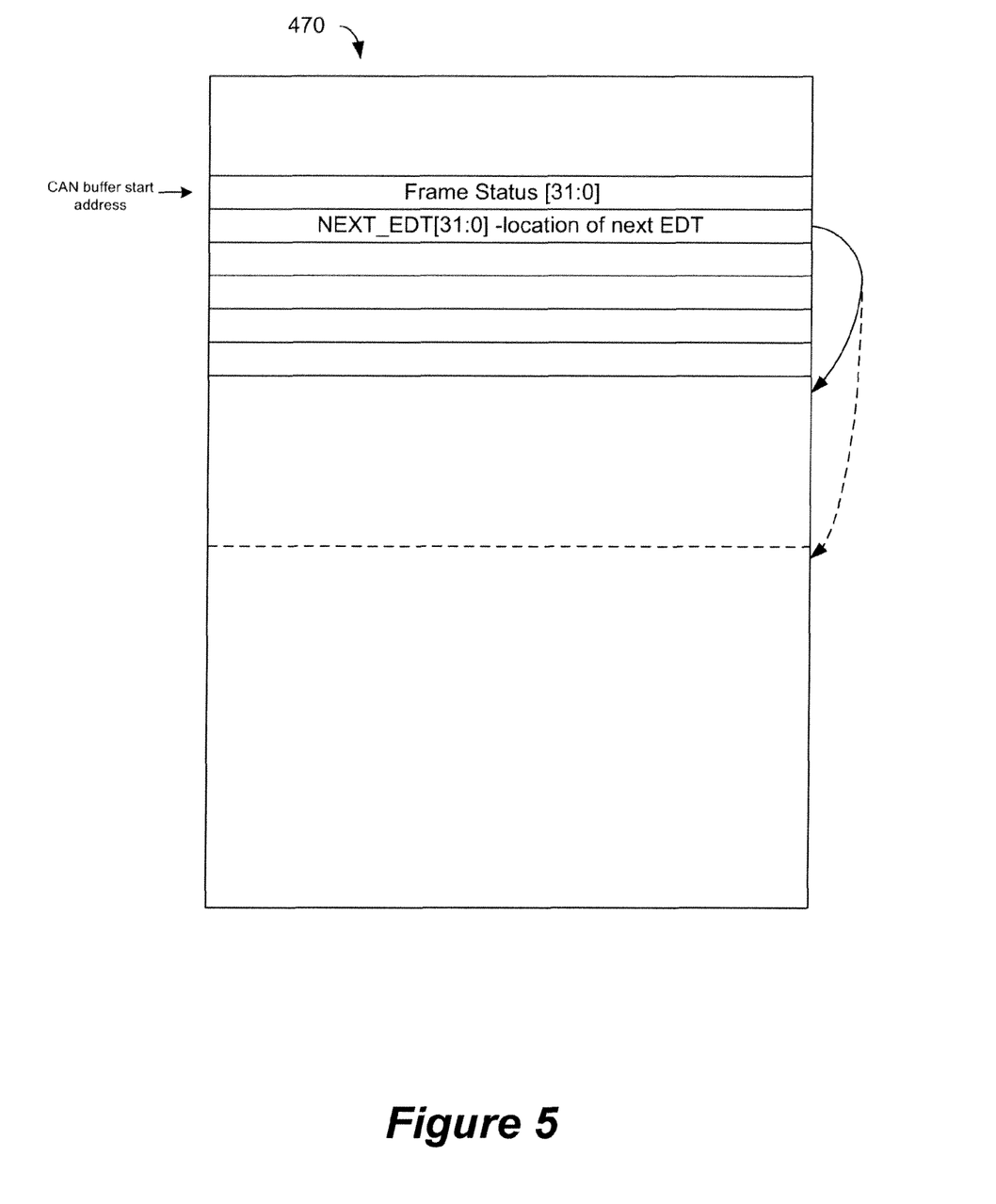
FIG. 5 show an random access memory of a microcontroller using the buffer descriptor table of FIG. 4.

FIG. 5 shows how the data can be stored in RAM 470. A CAN buffer start address which may be stored in a dedicated control register indicates the start of the table entries. The second 32-bit data word in each table entry contains the actual address of the next table entry which may be consecutive as shown by the solid line or non-consecutive as shown by the broken line.

The comparison of filter values stored in filter registers 425, 430 and transmitted identifiers is done in a bit-wise fashion rather than in parallel. Thus, parallel comparators, which need a relatively big amount of silicon real estate, are avoided. A serial data stream provided by CAN protocol engine 495 comprises an identifier which is fed directly to all bit comparator units 435, 440. Sequencer and control unit 410 address the mask registers 415, 420 and all filter registers 425, 430 to output a corresponding bit to the bit comparator units 435, 440. The bit comparator units 435, 440 compare all filter register bits with the respective identifier bit within a frame. The result is further processed by comparing it to the respective mask register bit. To this end, the additional storage bits of each filter register 425, 430 can indicate which mask register should be used for this comparison. This function will be explained in more detail below. The final comparison result will be accumulated for all bits of each identifier within a frame. If a single comparison fails the acceptance signal will not be generated. If every bit comparison is positive the acceptance signal will be fed to the descriptor table control unit 460 and to a respective input of OR gate 450.

Figure 6:
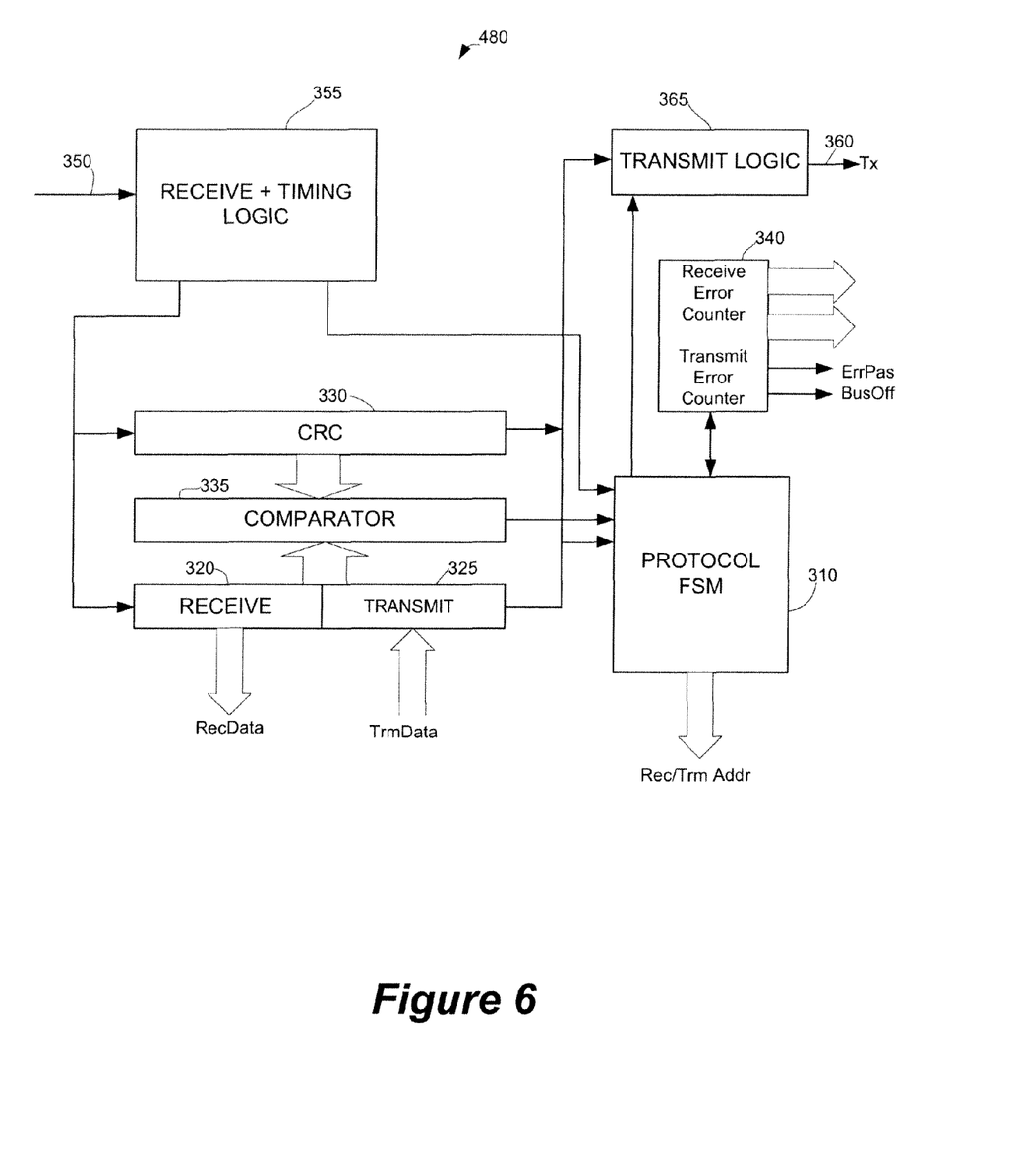
FIG. 6 shows an embodiment CAN protocol engine from FIG. 1.

FIG. 6 shows the CAN protocol engine 480 from FIG. 1 in more detail. The protocol engine 480 combines several functional blocks. The heart of the engine 480 is the protocol finite state machine 310 (FSM). This state machine sequences through the messages on a bit by bit basis, changing states of the machine as various fields of various frame types are transmitted or received. The FSM 310 is a sequencer controlling the sequential data stream between the RX/TX shift register 320, 325, the CRC Register 330, and the receive bus line 350 and transmit bus line 360, respectively. The shift registers 320, 325 can be part of the message assembly register 490. Additional components 355 and 365 are provided to convert the data streams and adapt to the respective timing on the bus lines 350 and 360. The FSM also controls the Error Management Logic 340 (EML) and the parallel data stream RecData between the TX/RX shift register 320, 325 and other components of the CAN module. The processes of reception arbitration, transmission, and error signaling are performed according to the CAN protocol. The FSM 310 also handles any automatic transmission of messages on the bus line.

The data interface to the protocol engine 480 consists of byte wide transmit and receive data. Rather than assembling and shifting an entire frame, the frames are broken into bytes. A receive or transmit address from the protocol FSM 310 signifies which byte of the frame is current. For transmission, the appropriate byte from the transmit buffer is selected and presented to the engine, which then uses an 8-bit shift register to serialize the data. For reception, an 8-bit shift register assembles a byte which is then loaded within the appropriate byte in the message assembly buffer 490.

The cyclic redundancy check register 330 generates the Cyclic Redundancy Check (CRC) code to be transmitted over the data bytes and checks the CRC code of incoming messages. The Error Management Logic (EML) 340 is responsible for the fault confinement of the CAN device. Its counters, the Receive Error Counter and the Transmit Error Counter, are incremented and decremented by commands from the Bit stream processor. According to the values of the error counters, the CAN controller is set into states error active, error passive or bus off.

The Bit Timing Logic (BTL) within unit 355 monitors the bus line input and handles the bus line related bit timing according to the CAN protocol. The BTL synchronizes on a recessive to dominant bus line transition at Start of Frame and on any further recessive to dominant bus line transition, if the CAN controller itself does not transmit a dominant bit. The BTL also provides programmable time segments to compensate for the propagation delay time and for phase shifts and in defining the position of the Sample Point in the bit time. The programming of the BTL depends on the baud rate and on external physical delay times.

Figure 7:
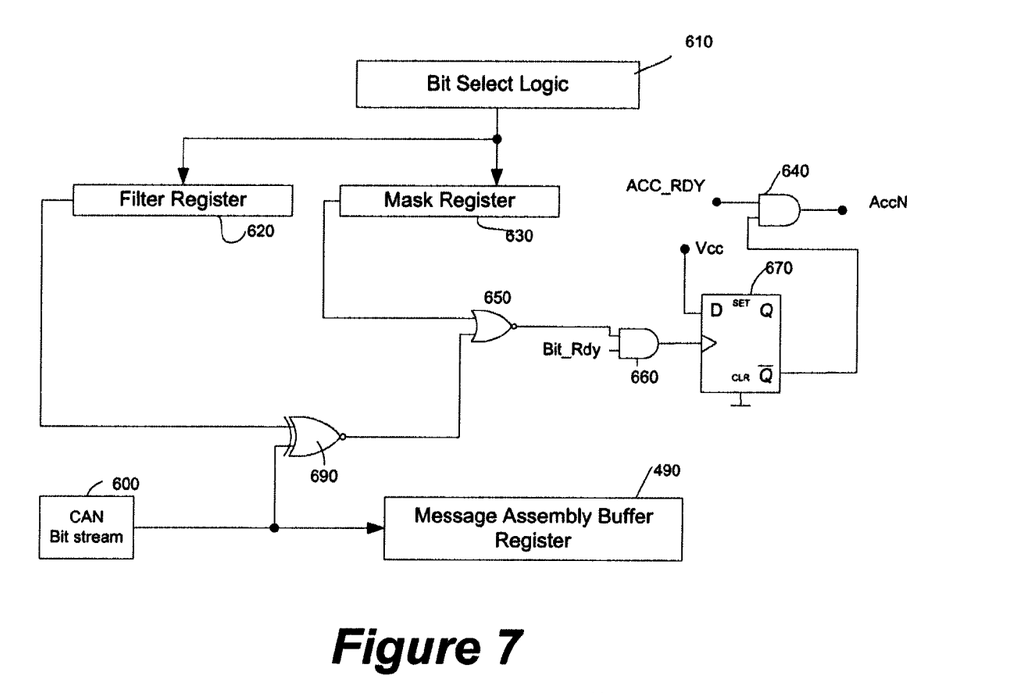
FIG. 7 shows an exemplary embodiment of a comparator unit.

In FIG. 7 an exemplary embodiment of a comparator unit shown. The details are shown for a single Bit comparator unit but apply for all other bit comparator units accordingly. Numeral 600 indicates a unit providing a CAN serial data stream which is fed to a message assembly buffer register 490 and the first input of an Exclusive NOR gate 690. The single bit output of a filter register 620 is coupled with the second input of Exclusive NOR gate 690 whose output is connected with the first input of a NOR gate 650. The second input of NOR gate 650 receives the single hit output signal from mask register 630. The output of NOR gate 650 is coupled with the first input of an AND gate 660 whose output is coupled with the control input of a D-Flip-Flop 670. Input D of D-Flip-Flop 670 is coupled with a logical "low" signal such as Vcc. The inverting output of D-Flip-Flop 670 is coupled with the first input of AND gate 640 whose output provides the acceptance signal. AND gates 640 and 660 comprises second inputs ACC_RDY and BIT_RDY, respectively which are used for synchronization with the respective input signals. A Bit Select Logic 610 is coupled with filter register 620 and mask register 630 to select the respective bits which will be used for comparison within each frame.

The incoming CAN bit stream is synchronized with the bit select logic 610. In other words, bit select logic 610 selects the respective bit in filter register 620 and mask register 630 that corresponds to the incoming bit of the serial bit stream. The actual comparator is formed by Exclusive NOR gate 690 which only generates a logic "high" at its output if both input signals are identical. NOR gate 650 is used as a mask unit to mask out a result if a respective bit within the mask register 630 is set. D-Flip-Flop 670 is used as a register to accumulate the results within a chain of comparisons and is preset to "1" at the start of a frame. Only if all comparisons within a frame are successful, then the acceptance signal AccN at the output of AND gate 640 will be generated. Otherwise the D-Flip-Flop 670 is set to "0" by a false comparison result and stays "0" until the end of the frame. The two control signals ACC_RDY and BIT_RDY are used to synchronize and activate the respective signals.

Figure 8:
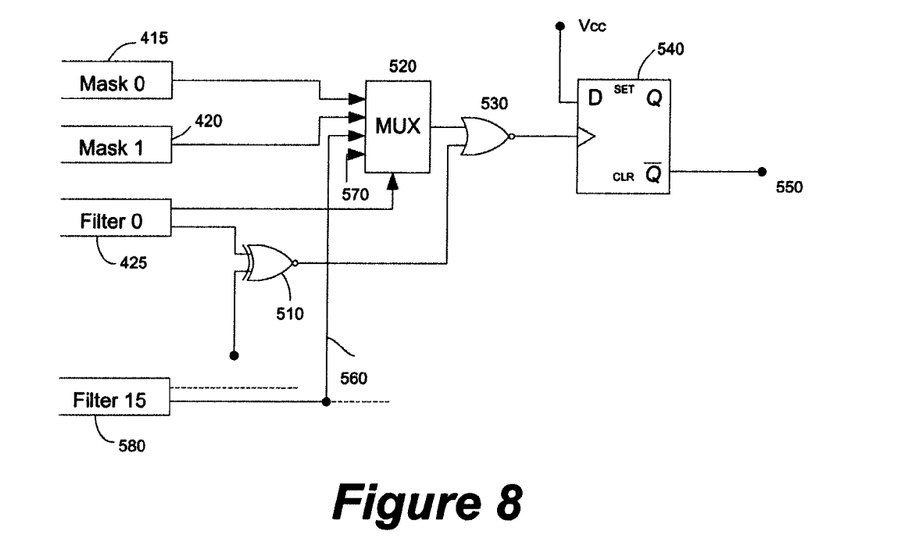
FIG. 8 shows another exemplary embodiment of a bit comparator unit.

FIG. 8 shows another exemplary embodiment of a bit comparator unit 435, 440 with even more functionality in more detail. Again, the details are shown for Bit comparator unit 0 but may apply for all other bit comparator units accordingly. The outputs of mask register 415 and 420 are coupled with first and second inputs of a 4:1 multiplexer 520. Additional input 560 and 570 can be provided at the third and fourth input of multiplexer 520. For example, input 560 is coupled with the output of filter register 15 which is designated by numeral 580. Filter register 425 comprises, for example, two additional outputs which are coupled with the select input of multiplexer 520. Multiplexer 520 can have any size, for example, can be expanded to a N:1 multiplexer increasing the number of masks to N. The output of multiplexer 520 is connected to the first input of a NOR gate 530. NOR gate 530 operates as a validation unit indicating whether a comparison result will be used or ignored. The second input of NOR gate 530 is coupled with the output of an Exclusive NOR gate 510 whose first input receives the bit output signal from filter register 425 and whose second input receives the serial data stream from CAN protocol engine 495. The output of NOR gate 530 is coupled with the control input of a D-Flip-Flop 540. The D-input of D-Flip-Flop 540 receives a logical low signal. The acceptance signal is carried at the negating output 550 of D-Flip-Flop 540.

According to an embodiment, the first comparison stage is formed by Exclusive NOR gate 510. In this stage the identifier bits of the serial bit stream are compared with the respective bits of filter register 425. Exclusive NOR gate 510 only generates a logic "high" at its output if both input signals are identical. Sequencer unit 410 selects the respective bits within filter register 425. Filter register 425 comprises additional data bits which indicate which mask register should be used. In this exemplary embodiment four different values can be selected. Either one of the mask registers 415 or 420 can be selected or a third value can be provided by another filter register, for example filter register 15. The fourth possible selection 570 can be used to indicate that no mask will be used by providing a respective level, for example, a logical "1". Thus, each filter register 425, 430 can be assigned an individual mask function. The selected mask value will be put at the first input of NOR gate 530. If the mask value indicates that the respective bit in filter register 425 should be used NOR gate 530 will operate as a controllable switch and feed the comparison result of Exclusive NOR gate 510 to the control input D-Flip-Flop 540. D-Flip-Flop 540 is used as a register which is preset to "1". If the result of one comparison is negative indicating no match and the respective mask bit is valid D-Flip-Flop 540 will be cleared and no acceptance signal 550 will be generated. D-Flip-Flop 540 thus will be reset to "0". D-Flip-Flop 540 will be preset to "1" again beginning with the next frame to compare another identifier as described above.

Any other type of appropriate logic can be used to implement the comparator. For example, controllable switches, equivalent Boolean operators, etc. can be used. Furthermore, the validation unit can be either put in front of the comparator or after the comparator. The essential function of a validation unit is to either incorporate selected bits or exclude them from comparison.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A microcontroller comprising:
   a random access memory;
   a Controller Area Network (CAN) controller comprising a control unit receiving an assembled CAN message, wherein the control unit stores each assembled CAN message directly by generating a single buffer descriptor table entry using said assembled CAN message in said random access memory, and wherein said single buffer descriptor table entry comprises at least a message identifier and load data from said CAN message and information of a following buffer descriptor table entry.

2. The microcontroller according to claim 1, wherein a buffer descriptor table entry has a constant size.

3. The microcontroller according to claim 1, wherein the buffer descriptor table entry further comprises a frame status and an extended CAN message identifier.

4. The microcontroller according to claim 1, wherein the microcontroller is a 32-bit microcontroller and the buffer descriptor table entry consists of six 32-bit words.

5. The microcontroller according to claim 1, wherein the buffer descriptor table entry consists of a frame status word, a next address location word, a message identifier word, an extended message identifier word, a first data word comprising four bytes, and a second data word comprising four bytes.

6. The microcontroller according to claim 1, wherein the random access memory is a dual- or multi-port memory.

7. The microcontroller according to claim 1, wherein the CAN controller comprises a message assembly buffer shift register coupled with said control unit.

8. The microcontroller according to claim 7, wherein the CAN controller comprises logic coupling a plurality of mask register and a plurality of filter registers with said control unit, wherein said logic generates a signal indicating a valid entry in said message assembly buffer shift register.

9. A method of storing a Controller Area Network (CAN) message within a microcontroller comprising the steps of:
receiving a first CAN message;
assembling the first CAN message;
generating a buffer descriptor table entry using said assembled CAN message at a predetermined fixed address; and
storing said buffer descriptor table entry directly at said predetermined fixed address in a random access memory of said microcontroller, wherein said buffer descriptor table entry comprises at least a message identifier and load data from said CAN message and address information of a following buffer descriptor table entry; and
receiving and assembling subsequent CAN messages and generating associated buffer descriptor table entries wherein each subsequent table entry is stored at an address determined by an address information stored in a previously stored buffer description table entry.

10. The method according to claim 9, wherein the CAN message can be a standard CAN message as well as an extended CAN message.

11. The method according to claim 9, wherein a buffer descriptor table entry has a constant size.

12. The method according to claim 9, wherein the buffer descriptor table entry further comprises a frame status and an extended CAN message identifier.

13. The method according to claim 9, wherein the microcontroller is a 32-bit microcontroller and the buffer descriptor table entry consists of six 32-bit words.

14. The method according to claim 9, wherein the buffer descriptor table entry comprises a frame status word, a next address location word, a message identifier word, an extended message identifier word, a first data word comprising four bytes, and a second data word comprising four bytes.

15. The method according to claim 9, wherein the random access memory is a dual- or multi-port memory.

16. The method according to claim 9, wherein the step of assembling a CAN message is performed by a message assembly buffer shift register.

17. The method according to claim 16, further comprising the step of generating a validity signal by means of a plurality of mask register and a plurality of filter registers indicating a valid entry in said message assembly buffer shift register.

18. A 32-bit microcontroller comprising:
a dual port 32-bit wide random access memory; and
a Controller Area Network (CAN) controller comprising a control unit receiving an assembled CAN message, wherein the control unit generates a buffer descriptor table entry using said assembled CAN message and stores said buffer descriptor table entry in said random access memory, and wherein said buffer descriptor table entry consists of a 32-bit frame status word, a 32-bit next address location word, a 32-bit message identifier word, a 32-bit extended message identifier word, a first 32-bit data word, and a second 32-bit data word.

19. The microcontroller according to claim 17, wherein the CAN controller comprises a message assembly buffer shift register coupled with said control unit.

20. The microcontroller according to claim 18, wherein the CAN controller comprises logic coupling a plurality of mask register and a plurality of filter registers with said control unit, wherein said logic generates a signal indicating a valid entry in said message assembly buffer shift register.

* * * * *